June 9, 1931. W. M. VENABLE 1,808,799
WEIGHING BATCHER
Filed Dec. 17, 1928
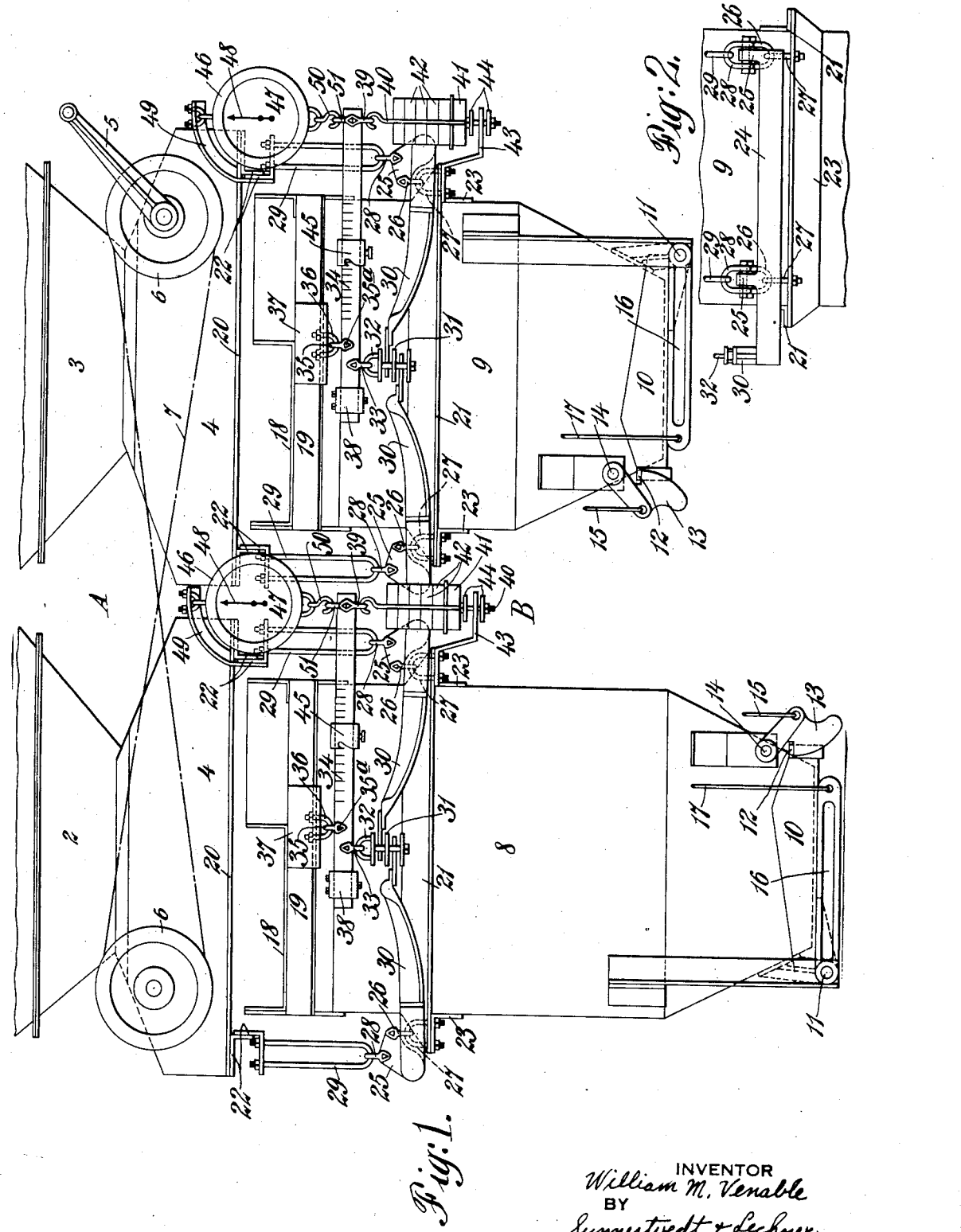
INVENTOR
William M. Venable
BY
Symnestvedt & Lechner
ATTORNEYS Patented June 9, 1931

1,808,799

UNITED STATES PATENT OFFICE

WILLIAM MAYO VENABLE, OF PITTSBURGH, PENNSYLVANIA, ASSIGNOR TO BLAW-KNOX COMPANY, OF PITTSBURGH, PENNSYLVANIA, A CORPORATION OF NEW JERSEY

WEIGHING BATCHER

Application filed December 17, 1928. Serial No. 326,585.

This invention relates to weighing batchers, or apparatus for the measurement and proportioning of materials, and is particularly useful in connection with the measurement and batching of sand, stone, and the like, in the making of concrete.

One of the primary objects of my invention is to insure the attainment of accuracy in the measurement of materials for concrete and to simplify the operation of weighing batchers.

Another important object is to reduce the likelihood of inaccuracy of adjustment or calibration of the weighing mechanism employed in batching apparatus.

Still another object of the invention is to make possible the absolute locating of the several points of fulcrum and support, for the parts of the weighing mechanism, upon the scene of manufacture, and thereby to eliminate the necessity for determining such locations at the field of operations, with a consequent elimination of the difficulties, expense and inaccuracies incident thereto.

Further objects of the invention are: to simplify the weighing mechanism, particularly by reduction of the parts required; to make readily possible the assemblage and shipment, as a self-contained unit, of the batcher and its weighing mechanism; to render the apparatus capable of easy installation in existing concrete-making equipments or of substitution for certain parts thereof as heretofore designed; to so co-ordinate the scales-mechanism with the usual material-feeding and other control devices as to simplify the task of the attendant or operator; to make it a very simple matter for the operator to determine when the proper amounts have been measured; and to give an automatic indication if and when the apparatus is out of proper adjustment.

How these objects and advantages, together with such others as are incident to the invention, or will occur to those skilled in the art, are obtained, will be clear from the following description, reference being had to the accompanying drawings, in which:

Figure 1 is a side elevation of a material delivering and batching apparatus embodying my invention; and Figure 2 is a fragmentary end elevational view taken from the right of Fig. 1.

In the drawings I have shown overhead material supply devices, indicated generally by the letter A, including a stone supply bin 2 and a similar sand supply bin 3, which, as now commonly employed in the art, are mounted or supported on standards or legs (not shown) at a height sufficient to provide room therebelow not only for the measuring and batching apparatus, indicated as a whole by the letter B, but also for the passage of a conveying truck, mixer, or the like, beneath said batcher to receive the materials discharged therefrom.

It will be understood that these bins may be isolated, each with a separate measuring hopper, or they may be located side by side, as here shown, and when so located (that is, in juxtaposition) they may both deliver either into a single hopper, such, for example, as shown in my issued Patent No. 1,663,574, or into separate measuring hoppers as shown in the present drawings. While the weighing mechanism of this invention is illustrated as applied to a construction having separate measuring hoppers, it should be understood that it may just as readily be applied to a construction using but one measuring hopper for a plurality of supply bins.

Any suitable means for controlling the delivery of materials from the supply bins may be employed, such as the gate devices shown in my aforementioned patent, or the gate means illustrated and claimed in the pending application of Messrs. Martin and Voelker, Serial No. 305,718, filed September 13, 1928, assigned to the assignee of the present invention. Such gate means includes a pair of gates (not shown), one for each bin, each supported between a pair of gate hangers 4, 4, and actuated, through suitable racks and pinions, by the control crank 5. Said crank is adapted to control both gates, through the intermediation of pulleys 6, 6 and chain or cable 7. Since this construction forms, per se, no part of my invention, but is fully described and illustrated in the said copending application of Martin and Voelker, it will not be described here in detail.

Below the gate hangers 4, 4, in position to receive the discharge from the gates under control of the handle 5, are positioned a pair of hoppers 8, 9, for measuring stone and sand, respectively. While these hoppers are here separate units, they embody certain features similar to those employed in the single-unit, two-compartment, hopper of the said Martin and Voelker application, viz; each has a trough-like discharge door 10, pivoted at 11, a bar or lug 12 engaging a latch 13 which is pivoted at 14 and which may be tripped by a cord or cable 15 to open the door, and an operating arm 16, fixed to the pivot 11, and having a cord or cable 17 by which the door may be closed either by a counterweight (not shown) or by hand.

Each hopper has also a flared edge or shelf 18, to provide an opening for the ready removal of excess material if that should be necessary, and a brace or bracket 19 therebelow. The usual longitudinal flanges 20, 20 and 21, 21 are provided, respectively, on the hangers 4, 4 and the hoppers 8, 9, transversely to which are located the angle bars 22 and 23, forming a structure by means of which the hopper-mechanism may be suspended from said flanges 20 of the superjacent gate hangers 4.

In accordance with the present invention, a weighing mechanism is provided which may be manufactured, assembled and shipped, as a unit with the hopper itself, or which may be substituted in existing weighing batchers for the scales previously employed, or which may further be substituted in place of the fixed supports usually employed between bin and hopper in apparatus which was originally designed to give volumetric measurement only. In other words, by simply removing either the scale supports or the fixed supports now commonly employed between the bin and hopper (said forms of supports being shown, respectively, in Figs. 1 and 4 of my aforementioned patent), the scales or weighing mechanism of the present invention may be readily substituted, and secured to the same flange structure, 20, on the bin, and 21, 23 on the hopper. The scale mechanism itself will now be described.

For each hopper (or for the combined or multi-compartment hopper, where such is used) I provide a pair of transverse beams 24, one at each end of the hopper, each carrying a pair of short lever arms 25. Adjacent the free end of each arm 25 is a link 26 having a knife-edge mounting thereon and connected to a U-bolt 27 which is secured to one of the angle bars 23 on the hopper. Intermediate the link 26 and the bar 24 is a link 28, also having a knife-edge connection to the arm 25, which is connected to a U-bolt 29 mounted on one of the angle members 22 for attachment to a flange 20 of the gate hanger. At one end of each of said bars or beams 24 is a lever 30 extending along the side of the hopper, the two levers 30 being loosely yoked together by the yoke structure 31 which hangs, by a U-bolt 32, from the link 33 having a knife-edge mounting on the scale lever or beam 34 near an end thereof.

The scale beam 34 fulcrumed at a point 35a by a knife-edge connection with link 35, is hung from the brace or bracket 19 of the hopper itself, through the intermediation of said link 35 and the U-bolt 36. A suitable shield 37 may be provided to protect the subjacent parts from falling particles of the material being handled. The short end of the beam 34 is preferably provided with a slidable weight 38, later to be referred to, while the longer end is connected, by a knife-edge and link structure 39, to the rod 40 on which is hung the counterpoise composed of the weight 41 and a plurality of removable units 42. A guide 43 is preferably provided on the hopper for the lower end of rod 40, which latter may be equipped with stop means 44, 44, spaced apart to permit full travel of the counterpoise, but adapted to prevent displacement of the parts. For progressive fractional adjustment up to a total amount equal to one of the weight units 42, there is provided a weight 45 slidable on the beam 34, which latter may be marked with suitable graduations.

For a purpose which will hereinafter appear, I prefer to add, to the operative structure so far described, what I term an auxiliary or "tell-tale" spring scale 46 having an ordinary dial 47 and cooperating indicator hand 48. This scale may be mounted at any convenient point, either on the hopper or on the superjacent bin, and it is here shown as being hung from one of the angle members 22 by means of an arm 49. Beam 34 (or some other part of the weighing mechanism, if preferred) is connected to the hook 50 of the spring scale by a suitable knife-edged link 51.

The adjustment and operation of the batcher will best appear after a brief comparison of the device with the prior art.

In devices heretofore employed, it has been the practice to provide a fixed fulcrum for the scale beam, hanging it either from the overhead supply bin or from some other fixed structure. Such arrangements have made it necessary to determine the location of the fulcrum point for the scale beam at the scene of operations, with the attendant necessity either of calibrating the scales after setting up the device for use or of experimenting rather extensively to obtain the proper point of fulcrum. A further difficulty has frequently arisen from the fact that, if the scales were to be conveniently located with respect to the batcher operator, (which is very desirable) auxiliary levers and links had to be employed to make the requisite connections between bin, hopper, and scale-box. In addition, the location of the points of support of the U-hangers has added to the complication of setting up the apparatus.

In the present device the fulcruming of the scale-beam on the hopper itself, and the pre-locating of all points of support, coupled with the calibration of the device (when manufactured) in such manner as to compensate for the mounting of scale-parts on the hopper, have eliminated all these disadvantages, as will hereinafter appear.

Assuming that the same scale-weights are to be used as have heretofore been supplied for ordinary weighing batchers, and that each such weight, representing 100 pounds when used on the scales, has itself a weight of 1 lb., the adjustment of the device will be as follows:

With the hook 50 of the tell-tale dial disconnected, and with counterweight 45 at the zero mark, a quantity of material weighing 100 lbs. is placed in the hopper, and a weight 42 (of 1 lb. actual weight) is placed on the hook 40. Fulcrum point 35a is then so located with respect to links 33 and 39 that the entire leverage system gives a reduction of 101 to 1. This is done because the actual weight supported from U-bolts 29 (over and above the fixed weight of the hopper itself, and the various scale levers and parts) is the weight of the 100 lbs. of material plus the weight of the 1 lb. scale-weight 42. With the fulcrum points so arranged, the beam 34 will be in balance, and the single weight 42 will indicate a weight of 100 pounds in the hopper. The ratio of 101 to 1 is used only by way of example, and if the actual weight of one of the scale-weights 42, designed to represent 100 lbs., was more or less than 1 lb., the calibration would be correspondingly different. The counterpoise 45, and the calibrations for it on the beam, must, of course, be designed so that this weight may be used for graduations in weight at least up to 100 pounds, if it is to be employed in connection with weights 42 representing 100 lbs. each.

To render the device more convenient, and speed up the weighing operations, I have provided scale 46 hereinbefore referred to. This may be mounted either on the hopper or on the bin, or other fixed support, and I have here shown it as mounted at the end of one of the angle members 22 within ready observation of the operator. Although not essentially so, it is preferably connected to beam 34 immediately above the weight hanger 40 so as to operate directly against the pull of the weights, but, if connected to the mechanism elsewhere, then the beam must be calibrated to compensate therefor. With the beam 34 in balance, the hook 50 is connected to link 51, the indicator hand 48 of the scale being at zero position.

Now, when it is desired to weigh out, for a batch, a quantity of material, the requisite number of weights 42 is placed upon the weight hook, or the counterpoise 45 is moved to the proper position, or both, depending upon the quantity to enter a batch. The weights operate to unbalance the beam 34 and to deflect the indicator hand 48. Material is then admitted to the batcher rapidly, (by manipulation of the usual gate handle 5), until the operator observes that the hand 48 is returning toward zero, whereupon the delivery of material from bin to hopper is made more gradually until the indicator reaches zero, at which time the desired weight of material has been placed in the hopper. The latch 13 may then be tripped for emptying the charge. Although only one weighing device has been here described, it will be evident that the other one shown is similar in construction, adjustment and operation.

Since the dial indicator is always brought to the zero mark, where the entire scales is in balance when the hopper is empty, it is immaterial whether the dial is mounted on a fixed support or on the hopper. By the same token, it is evident that if the mechanism should get out of adjustment or balance, the dial will indicate that fact immediately, and the weights 38 and 41 may be altered to restore the proper adjustment of the entire mechanism.

It will now be clear that the invention makes possible the complete assembling and calibration, at the point of manufacture, of weighing batchers; the whole device, from the supports 22 to the scale-beam 34 and all the associated parts (even including the tell-tale dial, if desired) being built, shipped, and applied to the bin, as a unit. All fulcrum points are predetermined, and the necessity for expert field men is eliminated, the only operation necessary upon installation being the removal of the old batcher (if such has been employed), and the securing of the supports 22 to the flanges 20 of the supply mechanism.

It will furthermore be observed that the whole scales mechanism is predeterminedly placed within convenient reach and observation of the operator of the supply-control handle 5, and this with fewer scale connections than ordinarily employed; that the weighing process is speeded up, particularly when the tell-tale dial is used, since the feeding of material may be done very rapidly and need be slowed up only when the pointer approaches a return to zero; that this arrangement, closely associated with the feed and dumping controls and the lateral hopper opening for removing excess material, insures accuracy and simplicity of operation; and that any misadjustment of the mechanism immediately shows itself and is readily remedied.

What I claim is:—

1. A weighing batcher including, in combination, a hopper, a fixed superjacent material supply means, connections therebetween including levers, and a scale beam connected to a lever and fulcrumed on the hopper.

2. A weighing batcher including, in combination, a hopper, a fixed superjacent material supply means, connections therebetween including levers, and a scale beam connected to a lever and fulcrumed on the hopper, together with a weight for the beam, and an indicator scale opposing the weight, whereby said indicator registers zero both when the beam is in balance and the hopper is empty and when the hopper is loaded to balance any given weight adjustment.

3. In combination, with a material supply means and a control device therefor, a weighing hopper supported from the supply means, lever means serving as a part of the support, and scale mechanism mounted on the hopper adjacent the control device and having connection to said lever means.

4. In combination, with a material supply means and a control device therefor, a weighing hopper supported from the supply means, and scale mechanism including lever means fulcrumed on a fixed support with a weigh-beam fulcrumed on the hopper and positioned for ready access by the operator of the control means.

5. In a device of the character described, a hopper constructed to be supported beneath a material supply device, a flared edge on the hopper, and scales mechanism mounted on the hopper beneath said edge and having connection also to a fixed support.

6. In combination, a supply bin, a subjacent hopper, means of permanent suspension of the latter from the former comprising links and scale levers, and a weigh-beam fulcrumed on said hopper and constantly operatively connected to said levers.

In testimony whereof I have hereunto signed my name.

WILLIAM MAYO VENABLE.